US005327710A

United States Patent [19]
Plamper et al.

[11] Patent Number: 5,327,710
[45] Date of Patent: Jul. 12, 1994

[54] MULTI-PURPOSE MOWING BLADE FOR DISCHARGE, BAGGING, AND MULCHING

[75] Inventors: Gerhard Plamper, Valley City; Daniel Martens, Brooklyn, both of Ohio

[73] Assignee: MTD Products Inc., Cleveland, Ohio

[21] Appl. No.: 4,287

[22] Filed: Jan. 14, 1993

[51] Int. Cl.⁵ .............................................. A01D 34/82
[52] U.S. Cl. ........................................ 56/255; 56/295; 56/DIG. 17
[58] Field of Search ........ 56/255, 295, 17.5, DIG. 17, 56/DIG. 20

[56] References Cited

U.S. PATENT DOCUMENTS

| 4,318,268 | 3/1982 | Szymanis | 56/255 |
| 4,995,228 | 2/1991 | Hladik, Jr. | 56/295 X |
| 5,094,065 | 3/1992 | Azbell | 56/295 X |

Primary Examiner—Terry Lee Melius
Attorney, Agent, or Firm—Lightbody & Lucas

[57] ABSTRACT

A mulching blade for a lawn mower including in combination a diagonal flange on the blade tip upwardly extending at a 20°, a neighboring cutout in the back of the blade, and a spaced downwardly extending flange section. These elements cooperate to recirculate the grass clippings in a circular manner through the region of the cutting edge so as to provide for a low inertia improved efficiency multi-purpose blade.

14 Claims, 3 Drawing Sheets

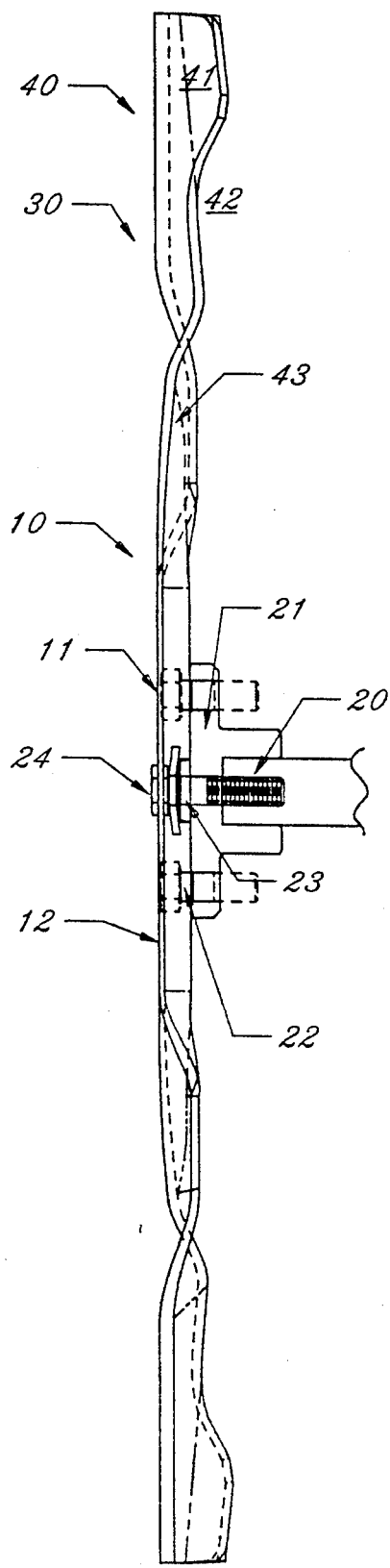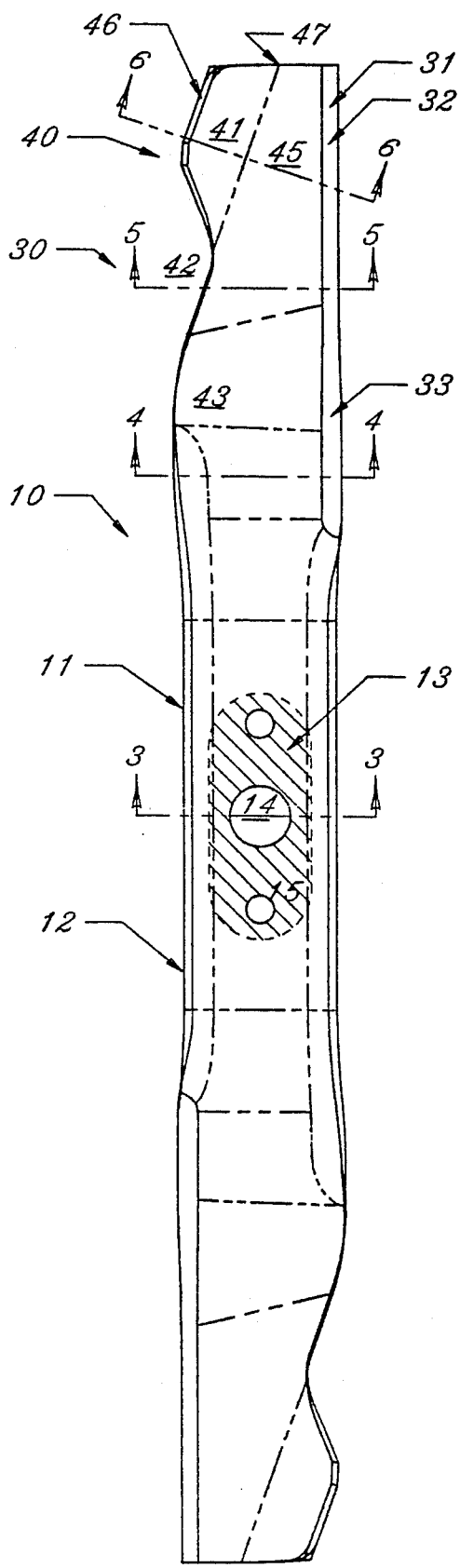

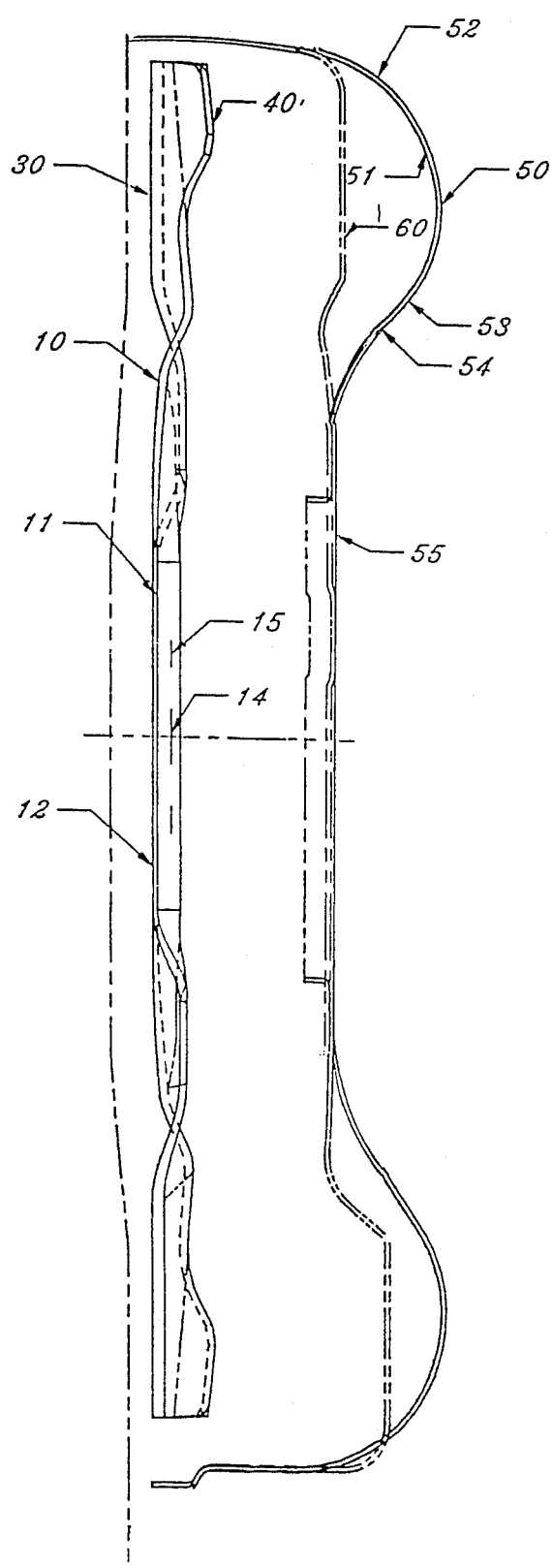
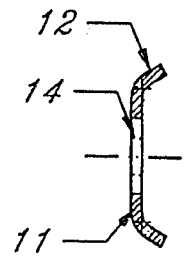
FIG 3
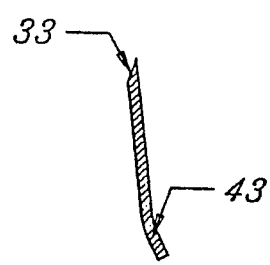
FIG 4
FIG 5
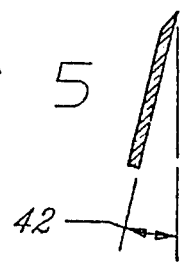
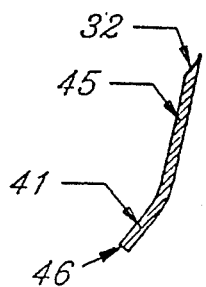
FIG 6

MULTI-PURPOSE MOWING BLADE FOR DISCHARGE, BAGGING, AND MULCHING

FIELD OF THE INVENTION

This invention relates to a mulching blade for use in rotary lawn mowers and other cutting implements.

BACKGROUND OF THE INVENTION

Rotary mowing blades are utilized in a wide variety of applications to cut and otherwise attend to ground maintenance. Examples of mower blades include a plain rectangular shaped thin steel member having sharpened ends through the more sophisticated mulching blades just as that shown in Azbel U.S. Pat. No. 5,094,065, Mulching Rotary Lawn Mower Blade. These blades are similar in that they all include sharpened ends of a rotating member, which sharpened ends cut the lawn or other vegetation in order to reduce its length (among other purposes). Some of these blades optimize cutting efficiency by transferring the maximum engine power to the rotary cutting edge. This type of blade typically is a straight blade having a limited cross sectional area. Other blades, such as the Azbel blade, attempt to maximize the mulching ability of the blade, but does this at a cost of increased cross sectional area and resulting increased horsepower demands. As the emissions standards for internal combustion engines tighten down, and as waste disposal becomes more problematical for the grass clippings, there is presently a need for a high efficiency low inertia mowing blade.

SUMMARY OF THE INVENTION

It is an object of this invention to provide for a low inertia high efficiency mulching blade for rotary lawn mowers.

It is an object of this invention to increase the mulching efficiency of rotary mulching blades.

It is an object of this invention to reduce the horse power requirements for an internal combustion engine used with mowers.

It is an object of this invention to provide for a universal blade which can be used in mulching and non-mulching applications.

It is an object of this invention to reduce the noise of lawn mower blades.

Other objects and a more complete understanding of the invention may be had by referring to the following description and drawings in which:

DESCRIPTION OF THE DRAWINGS

FIG. 1 is a top view of a mower blade incorporating the preferred embodiment of the invention of the application;

FIG. 2 is a side view of the mower blade of FIG. 1;

FIGS. 3-6 are selective cross sectional views of the mower blade of FIG. 1 taken along the sectional lines indicated; and, FIG. 7 is a side view like FIG. 2 with the addition of a deck housing;

DESCRIPTION OF THE PREFERRED EMBODIMENT

Figure 8:
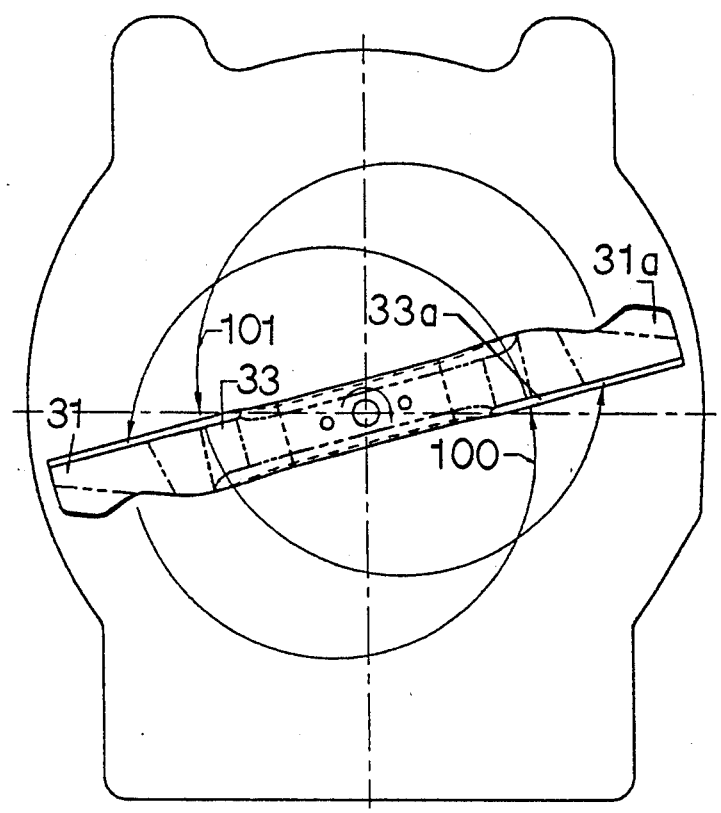
FIG. 8 is a conceptual view of the air flow in respect to the Blade of FIG. 1 in a mulching deck.

This invention relates to an improved mower blade. The invention will be described in its preferred embodiment of a shaft driven mower blade for a rotary type lawn mower.

The preferred mower blade 10 includes a mounting section 11 and a cutting/mulching section 30. The total length of the preferred blade is 21" long and 2½" wide with a thickness of approximately 0.13". Other blade lengths can be easily provided for with the same dies by reducing or increasing the length of the later described flanges 12 while using the same length cutting/mulching section 30. This reduces the manufacturing cost of a full inventory of blades of various lengths. Optionally the length of the cutting/mulching section 30 could be reduced (also or instead).

The mounting section 11 serves to interconnect the mower blade to the main engine (not shown). The engine can be a conventional piston engine, an electric motor, a hydraulic motor, or other source of rotary power. As later set forth, the power requirements for this engine are reduced based on the design of the mower blade. The particular mounting section 11 disclosed has a C shaped cross section having two downwardly extending flanges 12. These downwardly extending flanges have a center of curvature located approximately ¾" from the center line of the blade and extend downwardly at an angle. An angle from 30-70° is preferred (60° shown). These flanges 12 primarily serve to reinforce and strengthen the mounting section 11 by effectively increasing the thickness thereof. The downwardly extending flanges 12 may, in addition, slightly aid the circulation of the grass clippings about the mounting section 11 (as later described). Located in the central portion of the mounting section 11 is an area 13 for selectively interconnecting the mower blade 10 with the rotary engine. In the particular embodiment shown the blade 10 is connected to the engine by a "T" shaped flange 21. To accommodate this flange 21 the area 13 includes a central 0.820 diameter hole located on the center line of the mower blade 10 and two surrounding 0.382 diameter holes 15 located symmetrically in respect to the central hole 14 spaced approximately 1.25" therefrom.

To interconnect the mower blade 10 with the rotary engine in this embodiment, a flange 21 is fixedly connected to the bottom of the shaft 20 of the rotary engine. This flange 21 has a size approximating the area 13 of the mower blade 10. Two pilots 22 and a central pilot 23 extend downwardly off the flange 21. The central pilot 23 is longitudinally drilled for a bolt. The mower blade 10 itself is mounted on the flange 21 with the pilots 22 extending into the holes 15 and the central pilot 23 extending into the hole 14. A bolt and washer 24 from the underside of the blade into the central pilot 23 serves to hold the mower blade 10 to the flange 21 for rotary interconnection with the shaft 20. This attachment means has the advantage of extending the mechanical interconnection of torque outwards from the center of the blade by approximately the spacing of the holes 15. This improves the efficiency of the mechanical interconnection between the shaft and the mower blade 10. Alternately, other forms of attachments could be utilized between the mower blade 10 and the shaft 20. This would include a plain bolt and washer complex directly between the shaft 20 and the blade 10 such as those currently used in inexpensive lawn mowers.

The cutting/mulching section 30 is the main operative area for the lawn mower mower blade 10 in respect to cutting, mulching, and discharge (if appropriate) activities.

The cutting action is provided by a blade section 31 which extends along the forward outward edge of the mower blade 10 for a certain distance, in the embodiment shown approximately 6". This section is provided by milling the edge of the blade stock at an angle from a sharp edge, preferably an acute angle. This angle is approximately a 27° angle in the embodiment shown.

The outward section 32 of the cutting section 31 is the primary vegetation cutting part of the mower blade 10; this section initially separates the top sections of the vegetation from the remainder thereof. This outward section 32 is preferably the lowest point of the blade 10 in the preferred embodiment located some 7/16" below the top surface of the mounting section (later described).

The inward section 33 of the blade section 31 primarily is a re-cutting section which re-cuts air suspended clippings so as to reduce the size thereof. This inward section 33 is therefore the secondary cutting blade for the mower blade 10 (circulation of clippings later described). It is preferred that the inward section 33 be located above the outward section 32 (i.e., above the tops of the vegetation) so as to concentrate on this re-cutting function. In the preferred embodiment disclosed this inward section 33 is located substantially level with the top surface of the mounting section (later described).

The blade 10 also includes a circulating section 40 located behind the blade section 31. The circulating section 40 is used to recirculate and add velocity to the clippings once they have been initially separated from the vegetation by the active cutting section 32 of the blade 10. This section is also for discharge and bagging depending on the mode in which the blade is used. The circulating section 40 includes an angled tip section 41 and a cutaway and recirculation section 42.

The angled tip section 41 of the circulating section 40 is designed so as to aggressively propel certain of the clippings in respect to the outward section 32 of the mower blade 10. Due to the interaction with the mower deck, the clippings travel generally upward and inward if the blade is used in a mulching deck (FIG. 8) and generally upward and outward if the blade is used in a conventional deck (FIG. 9) (clipping flow and circulation later described).

The base 45 of the tip 41 is angled up slightly upwards with the extreme tip 46 angled upwards an additional amount along a line 47 extending substantially at an acute angle in respect to the longitudinal axis of the mower blade 10. ("Angled upwards" refers to the fact that the trailing part of the section is located above the leading part of the section. The reverse is true for "angled downwards".) The base 45 of this angled tip section 41 pulls the vegetation upwards from the cutting blade 31 while the extreme tip 46 increases the air flow. In the preferred embodiment shown, the base 45 of the tip 41 is angled up at preferably an angle of approximately 16° or less from the cutting section 32 of the blade 10 with the extreme tip 46 angled an additional 36° (20-45° preferred) along the line 47 extending at an acute angle of substantially 22° (15-30° preferred) in respect to the longitudinal axis of the mower blade 10.

The limited angle of the base 45 of the tip 41 allows clippings to slide off inwardly if there are too many clippings or the clippings are too heavy for immediate circulation. This allows the cutting section 31 of the blade 180° later (designated a) to recut the clippings (circulation later described). With an increased angle to this base 45, the clippings would not slide off as easily with a resultant loss of efficiency. The angle of the extreme tip 46 increases the air velocity for the suspended clippings. This results in an increase in pressure above the tip of the blade 10. This increase in pressure returns the clippings to the blade 10 for recutting in a mulching deck. In a normal deck, the pressure at the tip 41 increases the air flow and thus, the velocity of the clippings through the discharge chute (later described).

The cutaway section 42 of the circulating section 40 is an area having material physically removed from the back of the mower blade 10 so as to reduce the width of the mower blade 10 at this section. This cutaway section 42 reduces the noise of the mower blade and the upwards air flow at this point by reducing the lateral width of the blade. It, in addition, lightens the blade without substantially reducing the inertia thereof. The cutaway section 42 is preferably angled up by the same angle as the base 45 of the tip 41 so as to function as an extension thereof. The center of the cutaway section 42 is preferably in line with the Line 47 of the bend for the extreme tip 46 of the blade 10. This facilitates recirculation of clippings in a mulching deck by providing a smooth and direct air flow path inwards of such tip 46. This flow serves to guide the recirculating clippings. The fact that in the preferred embodiment the inward edge 46 of the cutaway section 42 is an extension of the line 47 further facilitates this action as does the location of the centerline 49 of the cutaway section 42 approximately mid-point between the outward section 32 and inward section 33 of the blade 10 (later described). The angle transition (later described) between the circulation section 40 and the mulching section 43 neighboring inboard of the cutaway section 42 also aid in the direction of the recirculating clippings.

The mulching section 43 of the circulating section 40 preferably serves to pull the clippings downward in respect to the mower blade 10, thus facilitating the recutting action of the inward section 33, 33a of the actual blade section 31, 31a. The mulching section 43, 43a is angled downward. As the leading inward section 33 of the cutting section 31 is displaced upwards in respect to the outward section 32, this downward angle of the mulching section 43 aids in pulling the suspended clippings from above the blade 10 downward into the plane traversed by the inward section 33, 33a of the cutting blade 31. The previously described relatively higher pressure above the tip 46 of the blade 10 facilitates this circulation. This circulation allows the inward section 33, 33a to recut the circulating clippings. The mulching section 43 in addition preferably pushes the recut clippings downward into the uncut vegetation being traversed by the lawn mower so as to create a fine mulch for this remaining vegetation. It is preferred that the mulching section 43 be angled downward at an angle from 5-15°. It is also preferred that the leading inward section 33, 33a is displaced a small distance, preferably upwards from the outward section 32 of the cutting section 31. In the preferred embodiment shown, this distance is 7/16" (¼-⅝" preferred). This allows the inward section 33, 33a to recut the circulating clippings above the uncut vegetation, thus again increasing the efficiency of the blade. In the preferred embodiment, this section 33 is also located ⅛-⅜" above the flat mounting section 11 (¼" displacement is shown). The angular transition, between angled upwards behind the outward cutting section 32 to angled downwards behind the inward cutting section 33, serves to pull suspended clippings diagonally across the blade 10 into the path of the inward cutting section 180° later. This path facilitates the recirculating action of the blade 10.

The above described action is facilitated by the shape of the mower deck 50.

In the mulching embodiment of this mower deck (FIG. 8), there would be a closed deck preferably having a raised curved shaped outer section 51 which serves to define an airflow path for the circulation section 30 of the mower blade 10. Preferably the shape of this raised curved outer section is designed in accord with standard airflow considerations. This means, for example, that the section 52 of the mower deck 50 that is subjected to the most rapid upward flow of air from the tip 46 of the mower blade 10 is located at a more acute angle in respect to such airflow, with the other sections 53, 54 serving to guide this airflow back towards the inward section 33, 33a of the circulating section 30. The inner section 55 of the mower deck 50 has a lower profile so as to confine recirculation to the cutting/mulching section 30. The general circular airflow in a mulching deck is shown in FIG. 8. In this airflow, there are two complementary paths 100, 101, each for the blade tips 31, 31a, respectively. In general, a grass clipping is severed from the grass with the outward cutting section 32. If the grass clipping is small enough, it is forced upward by the extreme tip 46. Due to the closed (i.e., recirculating) nature of the of the deck 50, this air suspended clipping travels upwards and then back downwards into the path traced by the cutting edge 31. This causes the clipping to be cut and recut until the clipping finally ends up in the cut vegetation as mulch. The spacing of the inward section 33 above the vegetation facilitates this recutting action. If the grass clipping is not small enough, or if there are in aggregate a sufficient quantity of grass clippings, the grass clipping slips inwardly off of the extreme tip into the cutaway section 42. Due to the blade design, the grass clippings pass inwardly from the extreme outermost tip of the blade and continue inwardly into the path traversed by the inward cutting section 33a. Due to the slight downward angle of the mulching section 43a following the cutting section 33a, some of these clippings are then forced downward into the uncut vegetation. At this time, they either remain in contact with the vegetation below the cutting height of the blade 10, or they are again contacted by the cutting blade 31 during its next rotation. At this time, the cycle begins anew. The combination of these two paths produces a mulching action.

Figure 9:
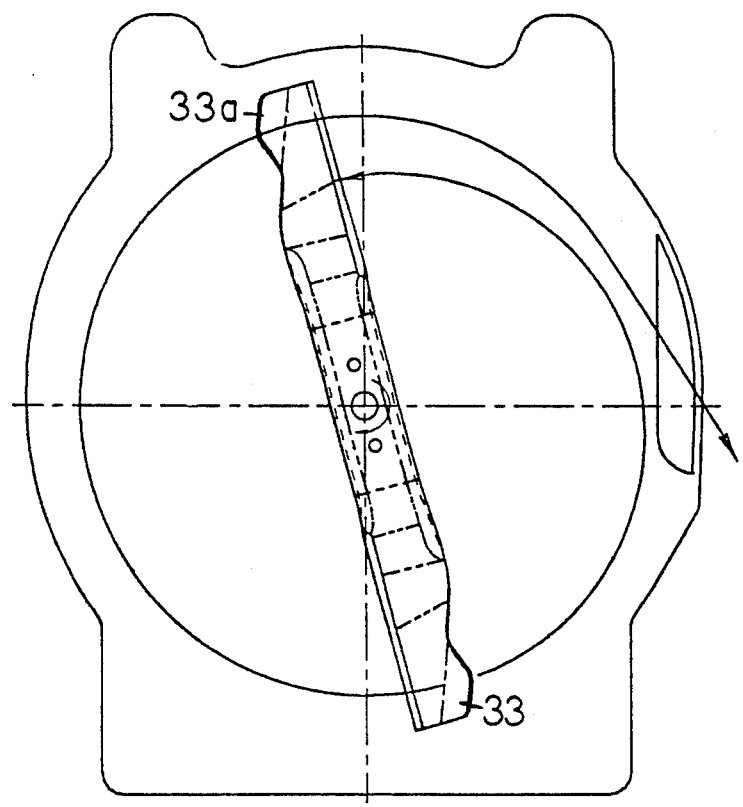
FIG. 9 is a conceptual view of the air flow in respect to the Blade of FIG. 1 in a bagging/discharge deck.

The cutting blade 10 can also be utilized with a bagging or discharge mower deck. This mower deck would typically have a flatter cross sectional profile as shown in dotted line 60 in FIG. 7. With such a mower deck, due to the lack of space for significant recirculation between the outward 40 and inward 33 section of the mower blade 10, the high pressure caused by the tip 41 of the blade 10 would increase the velocity of the cuttings out of the discharge opening as shown in FIG. 9. In this bagging/discharge deck, the outward section 32 of the cutting blade 31 again acts to separate the clippings from the growing vegetation. The clippings are then contacted by or swept into the air flow of the extreme tip 46 of the blade 10. In that the upward and circular airflow created by the extreme tip 46 has an outward facing opening through which it can escape (i.e., the discharge opening), the extreme tip 46 acts to provide a higher pressure higher velocity airflow through the discharge chute than that of a normal blade, thus facilitating the scattering or packing action for the discharge mower deck (packing improved by 25%). Under these circumstances, the inward section 33 of the cutting blade 10 would have a subsidiary or ancillary action because the recirculation airflow path which was produced by the mulching deck would be interrupted sufficiently such that the increased air pressure would be used more for the discharge action rather than any recirculation action. Any recutting action remaining would reduce the size of the clippings traveling out the discharge opening. Any mulching or recirculation activity would be ancillary. Instead, the increased cross section of the mower blade 10 would serve to circulate the air in a radial direction about the shaft 20 at a higher speed than with a conventional flat blade, thus facilitating the bagging of the grass clippings through use of a conventional discharge chute (not shown). Therefore, although the blade is designed primarily for an aggressive mulching and bagging action, the blade can be utilized in a conventional mower deck to increase the airflow efficiency of such deck.

Due to the above, the design of the mower deck can significantly alter the operation of the cutting blade.

Other factors may go into consideration in the design of the mower deck 50 as well. For example, if the mower deck 50 is a dual purpose mower deck to be utilized as both a bagging and mulching deck (at consumer or manufacture option), the profile of the mower deck 50 would be altered as such profile radially progressed around the shaft 20 so as to provide a secondary airflow into the optional bagging opening. If the mower deck was going to be utilized without a bagging opening, a plug would be inserted into the discharge opening in a manner to guide the radially progressing stream of air back towards the mower blade 10.

Although the invention has been described in its preferred embodiment with a certain degree of particularity, it is understood that changes and modifications may be had in respect to the preferred embodiment of the invention without deviating from the invention as hereinafter claimed.

What is claimed:

1. A mower blade for a rotary shaft, said mower blade comprising a mounting section, means to mount said mounting section to the rotating shaft, a mulching section, said mulching section being located radially outward of said mounting section, said mulching section including a cutting section on the leading edge thereof, said mulching section having a surface behind said cutting section, and said surface of said mulching section being angled downwardly in respect to said leading edge of said mulching section, an angled tip section, said angled tip section being located radially outward of said mulching section, said angled tip section including a cutting blade along the leading edge thereof, and said angled tip section having a surface, said surface of said angled tip section being angled upwardly in respect to said leading edge of said angled tip section, said angled tip section having a trailing edge, said trailing edge being located above said cutting section of said mulching section, said angled tip section including an extreme tip, and said extreme tip being angled upwardly in respect to said surface of said angled tip section at an acute angle in respect to the longitudinal axis of said mower blade.

2. The mower blade of claim 1 characterized in that said cutting section of said angled tip is the lowest portion of said mower blade.

3. The mower blade of claim 1 characterized by the addition of a cutaway section, said cutaway section being located radially outward of said mulching section between said mulching section and said angled tip section, said cutaway section including a cutout on the trailing edge thereof, said cutaway section including a cutting section on the leading edge thereof and said leading edge of said cutaway section being substantially located above said leading edge of said angled tip section.

4. The mower blade of claim 3 characterized in that said trailing edge of said angled tip section is the highest point of said mower blade.

5. The mower blade of claim 3 characterized in that said cutting section of said mulching section is approximately the same height as said cutaway section.

6. A mower blade for a rotary shaft, said mower blade comprising a mounting section, means to mount said mounting section to the rotating shaft, a mulching section, said mulching section being immediately adjacent to said mounting section radially outward thereof, said mulching section including a cutting section on the leading edge thereof, said mulching section having a flat surface behind said cutting section, said flat surface of said mulching section being angled downwardly in respect to said leading edge of said mulching section, a cutaway section, said cutaway section being located radially outward of said mulching section, said cutaway section including a cutout in the trailing section of the blade, said cutaway section including a cutting blade along the leading edge of the cutaway section, said cutaway section having a flat surface, and said flat surface of said cutaway section being angled upwardly in respect to said leading edge of said cutaway section, an angled tip section, said angled tip section being located radially outward of said cutaway section, said angled tip section including a cutting blade along the leading edge thereof, said angled tip section having a flat surface and said flat surface of said angled tip section being angled upwardly in respect to said leading edge of said angled tip section, said angled tip section including an extreme tip, and said extreme tip being angled upwardly in respect to said surface of said angled tip section at an acute angle in respect to the longitudinal axis of said mower blade.

7. The mower blade of claim 6 characterized in the said mounting section has leading and trailing edges, and said leading and trailing edges having downwardly extending flanges integral thereto.

8. The mower blade of claim 6 characterized in that said cutting section of said angled tip section is the lowest portion of said mower blade.

9. The mower blade of claim 6 characterized in that said cutting section of said mulching section is the highest point of said mower blade.

10. The mower blade of claim 6 characterized in that said cutting section of said mulching section is approximately the same height as said cutaway section.

11. The mower blade of claim 6 characterized in that said mounting section has a leading edge, and said leading edge being formed in a downward flange.

12. The mower blade of claim 6 characterized in that the mower blade is utilized with a mulching mower deck, and said mulching mower deck having a raised curved outer section over the mulching, cutaway, and angled tip sections.

13. The mower blade of claim 6 characterized in that the mower blade is utilized with a bagging mower deck and said bagging mower deck has a substantially flat outer section over the mulching, cutaway, and angled tip sections.

14. A mower blade for a rotary shaft, said mower blade comprising a mounting section, means to mount said mounting section to the rotating shaft, a mulching section, said mulching section being immediately adjacent to said mounting section radially outward thereof, said mulching section including a cutting section on the leading edge thereof, said mulching section having a flat surface behind said cutting section, said flat surface of said mulching section being angled downwardly in respect to said leading edge of said mulching section, a cutaway section, said cutaway section being located radially outward of said mulching section, said cutaway section including a cutout in the trailing section of the blade, said cutout having an inboard edge, said cutaway section including a cutting blade along the leading edge of the cutaway section, said cutaway section having a flat surface, and said flat surface of said cutaway section being angled upwardly in respect to said leading edge of said cutaway section, the transition between said downward angling of said mulching section and said upward angling occurring at the inboard edge of said cutout, an angled tip section, said angled tip section being located radially outward of said cutaway section, said angled tip section including a cutting blade along the leading edge thereof, said angled tip section having a flat surface and said flat surface of said angled tip section being angled upwardly in respect to said leading edge of said angled tip section, said angled tip section including an extreme tip, and said extreme tip being angled upwardly in respect to said surface of said angled tip section at an acute angle in respect to the longitudinal axis of said mower blade, and a line along said acute angle extending into said cutout.

* * * * *